United States Patent Office 3,525,635 Patented Aug. 25, 1970

3,525,635 MAGNETIC RECORDING MEDIA

Willis Dale Haller, St. Paul, Minn., assignor to Minnesota Mining and Manufacturing Company, St. Paul, Minn., a corporation of Delaware No Drawing. Filed July 1, 1965, Ser. No. 468,942
Int. Cl. H01f *10/06*
U.S. Cl. 117—71 6 Claims

ABSTRACT OF THE DISCLOSURE

Magnetic recording media having a dielectric substrate and a smooth surfaced magnetizable film of cobalt, nickel, iron or an alloy thereof, with an intermediate bonding layer containing an insulative polymeric matrix in which is distributed colloidal size particles of a nucleating metal for the electroless deposition of said magnetizable metals, the surface of said intermediate bonding layer having a surface resistance of at least $1 \times 10^6$ ohms per square exclusive of other materials therein.

This invention relates to an improved magnetic recording medium and to methods for its manufacture. In one aspect it relates to a flexible magnetic recording medium having high coercivity, high permeability and high remanence.

The magnetic properties of cobalt films prepared by electroless deposition techniques have been evaluated for use in high density digital recording, as reported in the Journal of the Electrochemical Society (August 1961), page 174C, including mention of the influence of such factors as bath pH, agitation, and rate of deposition on the magnetic properties. Electroless metal deposition refers to the chemical deposition or plating of an adherent metal coating on a suitable substrate without the use of an external source of electrical current. The electroless plating of cobalt onto a metallic substrate is described in U.S. Pat. No. 2,532,284, using an aqueous solution of a cobalt salt and a relatively low concentration of a hypophosphite reducing agent as a bath for the autocatalytic deposition process. U.S. Pat. No. 2,871,142 describes a method for maintaining the cobalt concentration of the plating bath and for removing detrimental ions from the spent plating solution with a cation exchange column. The coercive force $H_c$ of chemically reduced cobalt films on polyethylene terephthalate can vary from 200 to 1200 oersteds, depending on the grain development and grain size at a given thickness of the metal layer. In U.S. Pat. No. 3,150,939 a record carrier having a magnetic recording medium formed from iron, cobalt or nickel is described. The flexible dielectric sheet or record carrier contains a thin flexible, continuous, conductive bonding film of metal bonded thereto, this film providing metal nucleii for bonding a magnetizable ferromagnetic continuous metal film to the carrier surface with a firm fused metal-to-resin bond. The magnetizable ferromagnetic iron, cobalt or nickel film is then superimposed over and bonded to the metallized dielectric record carrier. Although a continuous electrically conductive metal bonding film can be prepared by such techniques as vacuum evaporation, cathode sputtering, chemical (electroless) plating or electroplating, these procedures can prove time consuming and can also require special equipment and careful control to insure uniformity. Moreover, the metal nuclei obtained by using the conventional electroless plating techniques to form the bonding film tend to be undesirably large, due to the preferential growth of the earlier formed nucleii as the electroless plating operation continues. As a result, the surface roughness of the priming or bonding film is relatively high, even after the electroless plating operation has been continued until a continuous, conductive film of metal nucleii is formed. A similar problem is encountered with vacuum deposition or cathode sputtering of the metal. In addition, much of the metallic material used in such procedures is located in the interior of relatively large particles and is accordingly unavailable to assist in bonding the magnetizable metal thin film to the dielectric resin substrate. Both because of time consuming processes and because of the high cost of metals such as palladium, the expense of such recording media, requiring relatively large quantities of metallic nuclei in the bonding layer, makes their use uneconomical except for specialized purposes.

It is therefore an object of this invention to provide a new magnetic recording medium.

Another object of this invention is to provide a magnetic recording medium having high density information storage capabilities and more uniform magnetic and physical properties.

Still another object of this inveniton is to provide a method for the simple and economical manufacture of magnetic recording media having high density information storage capabilities.

Other objects and adavntages will be apparent from the following disclosure.

In accordance with this invention a magnetizable, ferromagnetic, continuous film of a ferromagnetic material capable of electroless deposition is bonded to a dielectric substrate with an intermediate bonding layer comprising an insulative polymer matrix having uniformly distributed therein colloidal size particles of a metal capable of providing a nucleating surface for the electroless deposition of the ferromagnetic material, the surface of said intermediate bonding layer adjacent the ferromagnetic continuous film having available nucleating metal in contact with the ferromagneic material. The ratio of insulative polymer to nucleating metal in the intermediate bonding layer and the thickness of the intermediate bonding layer is selected to provide a bonding layer surface resistance, based only on these materials, of at least $1 \times 10^6$ ohms per square. Generally, the ratio of insulative polymer to nucleating metal is at least about ½ and preferably from 2/1 to 10/1. If desired, the overal surface resistance of the bonding layer may be made lower than $1 \times 10^6$ ohms per square by including in the bonding layer conductive materials which do not affect electroless deposition, i.e. non-nucleating materials such as conductive polymers, conductive salts, carbon, non-nucleating metals, etc.

Any of the nucleating metals useful in electroless deposition may be used in the form of colloidal size particles to provide the necessary nucleating surface, including such metals as gold, platinum, silver, rhodium, ruthenium, iridium, iron, cobalt, nickel and palladium, with the latter being preferred. Particle size should average less than 1000 angstroms preferably less than 100 angstroms.

The polymer matrix may be any insulative, organic or inorganic polymer which can be adhered or bonded to the dielectric substrate, preferably without the use of heat. To insure availability of sufficient nucleating metal surface for electroless deposition the polymer matrix must not fully encapsulate the nucleating metal particles at the surface but must serve to fix their spacial relationship and anchor them securely to the dielectric substrate. One test for polymer selection and for optimizing the ratio of insulative polymer to nucleating metal particles is as follows.

Approximately 9 grams of a polymer or polymer mixture to be tested is dissolved or dispersed in 1000 milliliters of a suitable solvent (e.g. methyl ethyl ketone) or a dispersing medium (e.g. water). To this is added 2.5 grams of palladium chloride dissolved in 7.5 milliliters of concentrated hydrochloric acid, after which 9 grams of sodium hypophosphite in 9 milliliters of water is added with stirring. Generally the mixture will turn black as the palladium chloride is reduced to free palladium metal with hydrogen evolution. Stirring should be continued for at least three hours until no further evolution of hydrogen is observed. The mixture is then filtered to remove undissolved material without removing the colloidal palladium metal particles. A sample of polyester film is then hand dipped into this mixture, removed and oven dried at 150° F. until the coating is dry. A 144 square inch sample of the coated polyester film is immersed for 20 hours at 190 to 200° F. in the following test solution:

1 liter distilled water
30.0 grams sodium hypophosphite
Buffered with sodium hydroxide-boric acid to a pH of 10.5.

At intervals during the period of immersion the bath is analyzed for sodium hypophosphite, utilizing the iodine titration technique ("Plating" magazine, July 1964). If the concentration of sodium hypophosphite decreases to 25 grams per liter or lower in the first ten hours of sample immersion, the polyester film coating has sufficient available nucleating palladium surface to permit electroless plating of a ferromagnetic metal.

The intermediate bonding film is readily prepared by coating the dielectric resin sheet with a thin film of a dispersion or solution of an insulative polymer, normally a film forming polymer, containing dispersed colloidal particles of the nucleating metal. Colloidal dispersions having relatively low solids content, usually below 15 weight percent, are preferred to minimize the thickness of the intermediate bonding film and more efficiently utilize the nucleating metal. Dry film thicknesses below about 1000 angstroms have proven to be most satisfactory. The colloidal dispersions may also contain melting agents, stabilizers, deflocculating agents, etc., as described in U.S. Pat. No. 3,011,920. If too little or no insulative polymer is used, the intermediate bonding layer has been found to be less firmly bonded to the dielectric substrate and to have a less uniform, and hence less efficient, distribution of the nucleating metal particles. The insulating polymeric binder matrix also tends to insure the structural identity of the bonding layer during the electroless deposition, thus permitting more accurate control of the electroless plating.

After the intermediate bonding layer has been formed, the magnetizable continuous ferromagnetic film is provided by any of the various electroless techniques for depositing a ferromagnetic metal in the presence of nucleating metal sites. Representative electroless techniques are shown in U.S. Pat. Nos. 2,532,284 and 2,871,142, the metals nickel, iron, cobalt and their alloys being preferred ferromagnetic materials. The resulting constructions are outstanding as magnetic recording media and have an average peak to peak irregularity (i.e. surface roughness) below about 4 microinches. Using the methods of this invention it is possible to produce magnetic recording media in film, plate or tape form with a surface roughness below 2 microinches. For purposes other than for magnetic recording media, the electroless plating techniques can also be used to provide non-ferromagnetic metal coatings.

The following examples are presented for purposes of illustration.

EXAMPLE 1

Palladium chloride (2.5 grams) was dissolved in 7.5 ml. of hydrochloric acid and 100 ml. of methyl ethyl ketone. This solution was then diluted with 900 ml. of methyl ethyl ketone, and a small amount (0.8 ml.) of a wetting agent ("Volan," coordination compound of chromium and methacrylic acid, E. I. du Pont de Nemours and Company) was added. About 8.8 grams of vinylidene chloride-acrylonitrile copolymer ("Saran F220," viscosity of 80 cps. as a 20 percent solids solution in methyl ethyl ketone at 25° C.) was then added, and the solution is mixed until all the copolymer was dissolved. The 8.8 grams of sodium hypophosphite in about 9 ml. water was added with stirring, and the stirring was continued for 3 hours. The solution turned dark brown-black as the palladium was reduced to colloidal, free palladium metal with the liberation of hydrogen. After filtration to remove undissolved salts the solution was applied to polyethylene terephthalate base film by dip coating and then dried at 150 to 250° F., the final coating thickness being less than 1000 angstroms. This bonding coating had a smoothness at least equivalent to the base film.

EXAMPLE 2

Two grams of a polyester of ethylene glycol and terephthalic acid-isophthalic acid (1/1 molar ratio) having a 22,000 number average molecular weight and a degree of polymerization of 100, was dissolved in 200 ml. of cyclohexanone. To the copolymer solution was added 15 ml. of a solution of 0.02 gm./ml. of palladium chloride with 5 percent by volume of concentrated hydrochloric acid in ethanol. Collodial palladium was formed with the addition of 0.5 ml. of water containing 0.5 gram of sodium hypophosphite and with continued stirring over a period of about 2 hours. After filtration to remove undissolved salts, the colloidal dispersion was coated onto polyethylene terephthalate film as in Example 1.

EXAMPLE 3

Onto both coated polyethylene terephthalate films of Examples 1 and 2 a magnetizable metallic cobalt recording layer was formed by treating the coated surfaces for about 3 minutes with the following electroless plating bath at a temperature of 150° F.

| | Gm./liter |
|---|---|
| $CoSO_4 \cdot 7H_2O$ | 30 |
| $NH_4SO_4$ | 62.5 |
| Sodium potassium tartrate | 75 |
| Sodium hypophosphite | 30 |
| Ammonium hydroxide (29% solution) to ph 9.0–9.5. | |

In both samples the magnetizable cobalt coating had a coercivity above 300 oersteds, residual induction of at least 8000 gauss and a ratio of residual induction to maximum induction of at least 0.7, with good bonding between the magnetizable layer and the carrier sheet. Both samples had a surface roughness of below 2 microinches.

EXAMPLE 4

To 1370 milliliters of analytical grade methyl ethyl ketone was added 90 milliliters of a 10 weight percent solution of vinylidene chloride-acrylonitrile copolymer ("Saran F–120," viscosity of 1000 cps. as a 20% solids solution in methyl ethyl ketone at 25° C.) in methyl ethyl ketone. 135 milliliters of a solution of 0.02 grams per milliliter palladium chloride in methyl ethyl ketone was then added, followed by 9.0 milliliters of a 50% solution of sodium hypophosphite added with stirring. Stirring was continued for 18 hours at room temperature. The solution turned black, indicating the formation of colloidal size particles of palladium metal.

Samples of 1 mil thick polyester was then hand dipped into the solution prepared as described above, removed and oven dried at 150° F. Samples were then plated by electroless deposition from the cobalt bath of Example 3 for periods of 135 seconds and 240 seconds. Both coated samples, after drying, had excellent magnetic properties. Tests of surface roughness, using the Bendix Proficorder showed that the original uncoated polyester film and the two plated samples all had a surface roughness below about 2 microinches, indicating that the primed and plated film was not detectably higher in surface roughness than the original polyester film.

EXAMPLE 5

The following iron-cobalt plating bath was prepared:

Ferrous sulphate—10 gm./liter
Cobalt sulphate—30 gm./liter
Ammonium sulphate—62 gm./liter
Sodium potassium tartrate—75 gm./liter
Sodium hypophosphite—30 gm./liter
Concentrated ammonium hydroxide—40 ml./liter
pH—10.5
Temperature—80° C.

A sample of polyester prepared as shown in Example 1 was dipped in the above bath for 4 minutes. A bright plating resulted and good adhesion to the substrate was obtained. The resulting plated layer comprised a ferromagnetic cobalt-iron alloy with good magnetic properties.

EXAMPLE 6

Using the procedure of Examples 1 and 3, substituting chlorinated rubber (67 weight percent chlorine, viscosity of 160 cps. in 20 weight percent solution in toluene at 25° C., "Parlon Type S–125," Hercules Powder Company, Inc.) for the vinylidene chloride-acrylonitrile copolymer, an electroless plated cobalt magnetic recording medium having good magnetic and physical properties was produced.

EXAMPLE 7

Using the procedure of Examples 1 and 3, substituting polyvinyl chloride (with minor amount of vinyl acetate) having a viscosity of 34 cps. in 10 weight percent solution in methyl ethyl ketone at 25° C. ("VC–171," The Borden Chemical Company) for the vinylidene chloride-acrylonitrile copolymer, an electroless plated cobalt magnetic recording medium having good magnetic and physical properties was produced.

Various other embodiments of this invention will be apparent to those skilled in the art without departing from the spirit and scope thereof.

The embodiments of the invention in which an exclusive property or privilege is claimed are defined as follows:

1. In a magnetic recording medium having a dielectric substrate and a magnetizable continuous film of ferromagnetic cobalt, nickel, iron or an alloy thereof deposited by electroless deposition, an intermediate bonding layer therebetween which comprises an insulative polymer matrix having uniformly distributed therein colloidal size particles of a metal capable of providing a nucleating surface for the electroless deposition of said ferromagnetic material and having a particle size below 1000 angstroms, the surface of said intermediate bonding layer adjacent said magnetizable continuous film having available nucleating surface in contact with said ferromagnetic material, said insulative polymer and said particles of metal providing an intermediate bonding layer surface resistance of at least $1 \times 10^6$ ohms per square exclusive of other electrically conductive materials therein and said magnetizable continuous film having a surface roughness below 4 microinches.

2. The recording medium of claim 1 in which the intermediate bonding layer has a dry film thickness of less than 1000 angstroms.

3. The recording medium of claim 1 in which the surface roughness of said magnetizable continuous film is below 2 microinches.

4. The recording medium of claim 1 in which the dielectric substrate is a flexible organic polymer in sheet or tape form.

5. The magnetic recording medium of claim 1 in which said metal capable of providing a nucleating surface for the electroless deposition is palladium.

6. The magnetic recording medium of claim 5 in which said ferromagnetic material comprises cobalt.

References Cited

UNITED STATES PATENTS

| | | | |
|---|---|---|---|
| 1,847,860 | 3/1932 | Best | 117—240 |
| 2,796,359 | 6/1957 | Speed | 117—239 |
| 3,011,920 | 12/1961 | Shipley | 117—47 X |
| 3,150,939 | 9/1964 | Wenner | 117—240 |
| 3,216,846 | 11/1965 | Hendrix et al. | 117—239 |
| 3,219,471 | 11/1965 | Chilton et al. | 117—240 |
| 3,226,256 | 12/1965 | Schneble et al. | 117—217 X |
| 3,245,826 | 4/1966 | Luce et al. | 117—47 |
| 3,269,854 | 8/1966 | Hei | 117—71 X |
| 3,284,324 | 11/1966 | Appel et al. | 117—71 X |
| 3,353,986 | 11/1967 | Mathias et al. | 117—71 X |

FOREIGN PATENTS

| | | |
|---|---|---|
| 669,064 | 8/1963 | Canada. |
| 709,352 | 5/1965 | Canada. |

WILLIAM D. MARTIN, Primary Examiner

B. D. PIANALTO, Assistant Examiner

U.S. Cl. X.R.

117—71, 160, 217, 239, 240